United States Patent
Huang et al.

(10) Patent No.: US 8,650,425 B2
(45) Date of Patent: Feb. 11, 2014

(54) COMPUTER SYSTEM FOR PROCESSING DATA IN NON-OPERATIONAL STATE AND PROCESSING METHOD THEREOF

(75) Inventors: Chung-Ching Huang, Taipei (TW); Yeh Cho, Taipei (TW); Kuo-Han Chang, Taipei (TW); Liang-Min Lee, Taipei (TW); Donna Lim, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 644 days.

(21) Appl. No.: 12/774,041

(22) Filed: May 5, 2010

(65) Prior Publication Data

US 2010/0287395 A1    Nov. 11, 2010

Related U.S. Application Data

(60) Provisional application No. 61/175,804, filed on May 6, 2009, provisional application No. 61/218,662, filed on Jun. 19, 2009.

(30) Foreign Application Priority Data

Aug. 19, 2009  (TW) ............................... 98127829 A
Sep. 9, 2009   (TW) ............................... 98130361 A
Dec. 31, 2009  (TW) ............................... 98146217 A

(51) Int. Cl.
*G06F 1/26*    (2006.01)
*G06F 1/32*    (2006.01)

(52) U.S. Cl.
USPC ........... 713/323; 713/300; 713/320; 713/324; 700/295

(58) Field of Classification Search
USPC ................... 713/300, 320, 323, 324; 700/295
See application file for complete search history.

(56) References Cited

U.S. PATENT DOCUMENTS

2006/0028398 A1   2/2006   Willmore
2006/0172801 A1   8/2006   Hussaini et al.

(Continued)

FOREIGN PATENT DOCUMENTS

CN    1530953    9/2004
CN    2697720    5/2005

(Continued)

OTHER PUBLICATIONS

Chinese language office action dated Jun. 9, 2011.

(Continued)

*Primary Examiner* — Kim Huynh
*Assistant Examiner* — Michael J Brown
(74) *Attorney, Agent, or Firm* — McClure, Qualey & Rodack, LLP

(57) ABSTRACT

A computer system for processing data in a non-operational state and processing method thereof are provided. The computer system includes a data output unit, a data source, a data processing module and a state monitor unit. The data processing module accesses and processes data from the data source, and transmits the processed data to the data output unit. The state monitor unit monitors a power supply state of the computer system to generate a state switch signal, which indicates whether the computer system is in an operational state or a non-operational state. When the state switch signal indicates that the computer system is in a non-operational state, the data source and the data processing module receives operating voltages to access and process data.

16 Claims, 8 Drawing Sheets

(56) References Cited

U.S. PATENT DOCUMENTS

| | | |
|---|---|---|
| 2008/0031252 A1* | 2/2008 | Oskouy et al. ............... 370/392 |
| 2008/0148083 A1* | 6/2008 | Pesavento et al. ............ 713/322 |
| 2009/0083562 A1* | 3/2009 | Park et al. .................... 713/323 |
| 2009/0138133 A1 | 5/2009 | Buchholz et al. |
| 2009/0193243 A1* | 7/2009 | Ely .................................. 713/2 |
| 2010/0275065 A1* | 10/2010 | Cornelius et al. ............... 714/37 |

FOREIGN PATENT DOCUMENTS

| | | |
|---|---|---|
| EP | 1 879 143 | 1/2008 |
| TW | 534388 | 5/2003 |
| TW | 200415455 | 8/2004 |
| TW | I269963 | 1/2007 |
| TW | 200905624 | 2/2009 |

OTHER PUBLICATIONS

English language translation of abstract of CN 2697720 (published May 4, 2005).
Chinese language office action dated May 6, 2011.
English language translation of abstract of CN 1530953 (published Sep. 22, 2004).
English language translation of abstract of TW 200415455 (published Aug. 16, 2004).
English language translation of abstract of TW 534388 (published May 21, 2003).
English language translation of abstract of TW 1269963 (published Jan. 1, 2007).
English language translation of abstract of TW 200905624 (published Feb. 1, 2009).

* cited by examiner

COMPUTER SYSTEM FOR PROCESSING DATA IN NON-OPERATIONAL STATE AND PROCESSING METHOD THEREOF

CROSS REFERENCE TO RELATED APPLICATIONS

This application claims priority of U.S. Patent Application No. 61/175,804, filed on May 6, 2009, the entirety of which is incorporated by reference herein. This application claims priority of U.S. Patent Application No. 61/218,662, filed on Jun. 19, 2009, the entirety of which is incorporated by reference herein. This application claims priority of Taiwan Patent Application No. 098146217, filed on Dec. 31, 2009, the entirety of which is incorporated by reference herein. This application claims priority of Taiwan Patent Application No. 098127829, filed on Aug. 19, 2009, the entirety of which is incorporated by reference herein. This application claims priority of Taiwan Patent Application No. 098130361, filed on Sep. 9, 2009, the entirety of which is incorporated by reference herein.

BACKGROUND OF THE INVENTION

1. Field of the Invention

The disclosure relates generally to computer systems and methods for processing data thereof, and, more particularly to computer systems that can process data at a non-operational state, and methods thereof.

2. Description of the Related Art

Advancements continue to made, in hardware manufacturing technology and software services. Also, computer product and service providers, in efforts to keep up with the requirements and hold interest, of users, constantly try to improve operational efficiencies and speeds of equipment and applications. However, computer systems with powerful functions providing highly efficient hardware or application services require relatively high amounts of power when the computer system is operated. After the computer system is activated, the power supply source of the computer system must output lots of power to support the overall operation of the computer system.

Sometimes, users may activate the computer system to perform only one or two simple tasks, such as browsing photo, listening to music, reading e-books or playing games. Even though only one application service is performed, the computer system still needs to provide full operational efficiency and power to support the overall operation. In this case, much of the operational efficiency and power consumed by the computer system is wasted. Furthermore, if the computer system is a portable computer product, such as notebook computer, users cannot heartily use application services thereof for a long time since the battery power of the portable computer product is limited. For manufacturers of computer systems and consumers, the above dilemma has yet to be resolved.

BRIEF SUMMARY OF THE INVENTION

An objective of the invention is to provide a mechanism, wherein a computer system can process data at a non-operational state, to decrease the wasting of power.

In order to achieve the objective, computer systems for processing data in a non-operational state and processing methods thereof are provided.

An embodiment of a computer system for processing data in a non-operational state comprises a data output unit, a data source, a data processing module and a state monitor unit. The data processing module accesses and processes data from the data source, and transmits the processed data to the data output unit. The state monitor unit monitors a power supply state of the computer system to generate a state switch signal; which indicates whether the computer system is in an operational state or a non-operational state. When the state switch signal indicates that the computer system is in a non-operational state, the data source and the data processing module receives operating voltages to access and process data.

In an embodiment of a method for processing data in a non-operational state for a computer system comprising an operational state and a non-operational state, it is determined whether the computer system is in a non-operational state, wherein the computer system comprises a logic operation module and a data processing module. When the computer system is in a non-operational state, the data processing module receives operating voltages required for processing data, obtains and processes data from a network control unit or a data access unit, and outputs the data processed by the data processing module to a data output unit.

The computer systems for processing data in a non-operational state and processing methods thereof can utilize a power-saving mechanism to enable a computer system to be used to process data when the computer system is in a non-operational state. In addition to improving efficiency of computer systems, manufacturing costs are also considered, when providing the mechanism of the invention.

Method for processing data in a non-operational state for a computer system may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Computer systems for processing data in a non-operational state and processing methods thereof are provided.

Figure 1:
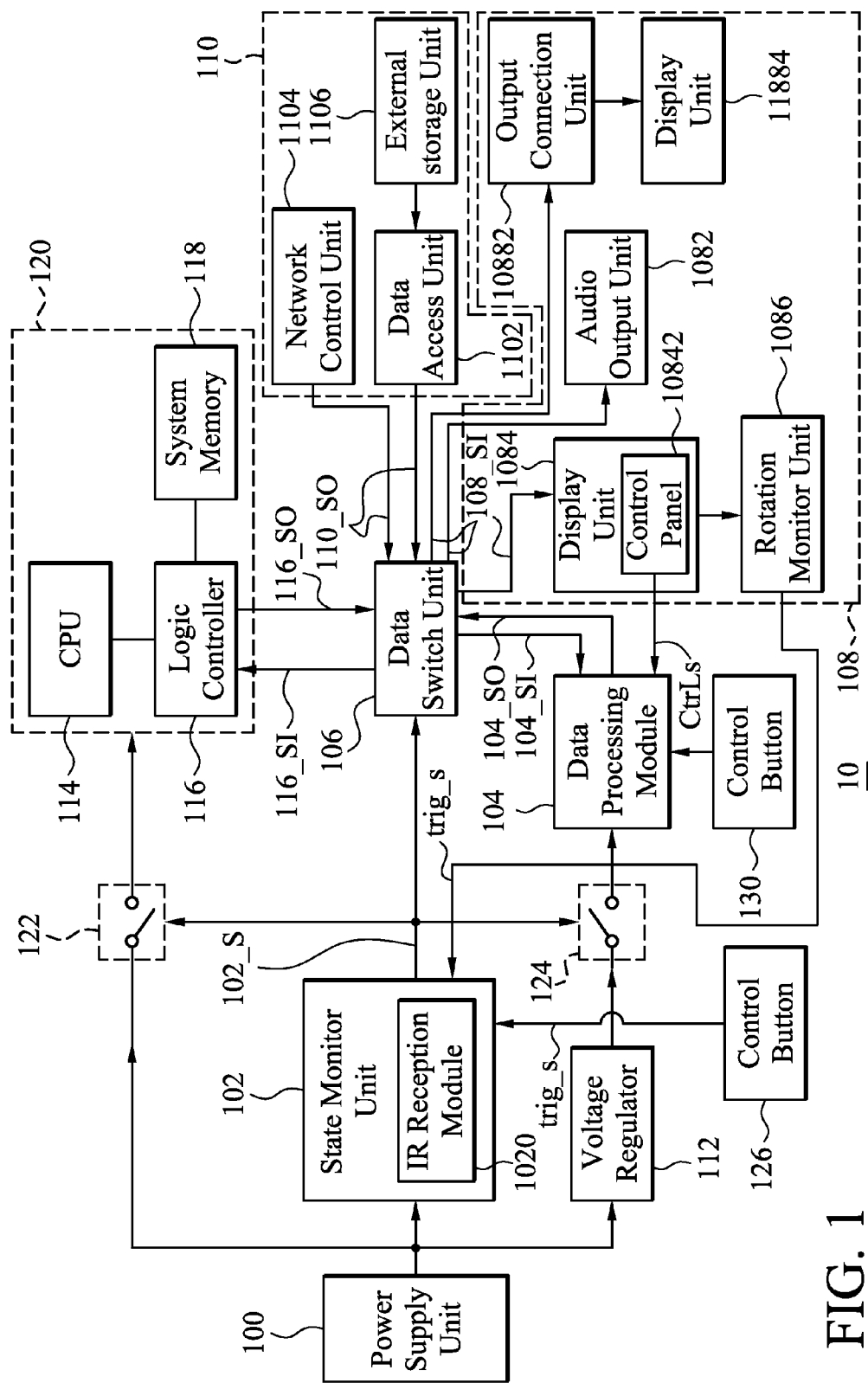
FIG. 1 is a schematic diagram illustrating an embodiment of a computer system for processing data in a non-operational state of the invention.

FIG. 1 is a schematic diagram illustrating an embodiment of a computer system for processing data in a non-operational state of the invention. The computer system 10 in the embodiment may be a portable computer, for example, such as a notebook, a Netbook, and other similar handheld electronic devices. The computer system 10 is supplied with power via a power supply unit 100. The power supply unit 100 may be a battery of the portable computer or an AC power source, used to supply power required for the computer system 10 in various operational states.

The execution state of the computer system 10 comprises an operational state and a non-operational state. In the embodiment, the non-operational state may comprise a suspend/standby state (S3), a hibernation state (S4) and a soft off state (S5) defined for system power state in the ACPI (Advanced Configuration and Power Interface). The operational state may be the state defined in the system power state except for the suspend state, the hibernation state and the soft off state.

The computer system 10 of the first embodiment comprises a state monitor unit 102, a data processing module 104, a data switch unit 106, a data output unit 108, a data source 110, a logic operation module 120, and power switch units 122 and 124. The logic operation module 120 is one of the elements used for processing logic operations in the computer system 10. The logic operation module 120 comprises a central processing unit (CPU) 114, a logic controller 116 (such as South and North Bridge chips), and a system memory 118.

The power supply unit 100 of the computer system 10 can supply power when the computer system 10 is in the operational state. Unless the power supply unit 100 is completely separated or removed from the computer system 10, the power supply unit 100 can still supply power to some system components when the computer system 10 is in the non-operational state, such that the system components can maintain operation. For example, in a general computer system, an embedded controller (EC) can keep on obtaining the standby power of the power supply unit 100 to detect the power supply state of the computer system. In the embodiment, for discussion purposes, the EC can be used as the state monitor unit 102 of the computer system 10. It is noted that, the state monitor unit 102 in the embodiment of the invention can also be any device in the computer system 10, which can detect the power supply state of the computer system 10. Persons skilled the art can use other device to replace the EC.

As described, since the state monitor unit 102 continues to receive power supplied by the power supply unit 100, the state monitor unit 102 can continue to monitor the power supply state, such as the current value output by the power supply unit 100, from the power supply unit 100 to the computer system 10, to determine whether to assert a state switch signal 102_S.

When the state monitor unit 102 determines that the computer system 10 is in the non-operational state (for example, when the current value output by the power supply unit 100 is less than a predefined threshold value), the state monitor unit 102 asserts the state switch signal 102_S, and enables the computer system 10 to enter the non-operational state. At this time, the power switch unit 124 is closed based on the state of the state switch signal 102_S, and the power switch unit 122 is opened based on the state of the state switch signal 102_S, such that the power supply unit 100 can input operating voltages required by the data processing module 104 to the data processing module 104.

Further, the asserted state switch signal 102_S also controls the data switch unit 106 to output data from the data source 110 (as the output data 110_SO of the data source 110), and input the data (104_SI) to the data processing module 104 for further processing via the connection and transmission of the data switch unit 106. The data source 110 may be any one or a combination of the data access unit 1102, the network control unit 1104, and other appropriate data sources, and users can select appropriate data sources according to different requirements. That is, the data input to the data processing module 104 may be a single data source or multiple data sources.

Furthermore, the data access unit 1102 may be a card reading device or a USB (Universal Serial Bus) port/adapter on the computer system 110, wherein the card reading device or the USB port/adapter is used for external storage unit 1106 connection. For example, the card reading device can be used to connect with and read a memory card, such as Flash, CF or SD card, or the USB port/adapter can be used to connect with an external hard disk supporting the USB interface. The data access unit 1102 connects and reads the data stored in the external storage unit 1106, and transmits the data to the data processing module 104 for processing. The network control unit 1104 may be the NIC (Network Interface Controller) originally equipped in the computer system 10, in which the NIC allows the computer system 10 to access data stored therein, except for data in the hard disk (not shown) and the external storage unit. That is, the network control unit 1104 can enable the computer system 10 to download data from an Internet, and transmit the data to the data processing module 104 for processing. Meanwhile, the asserted state switch signal 102_S also enables the data processing module 104 to transmit the processed data, as the output data 104_SO, to the data switch unit 106, and enables the data switch unit 106 to transmit the processed data, as the input data 108_SI of the data output unit 108, to the data output unit 108 for data output.

It is noted that, since the data processing module 104 is activated when the computer system 10 is in the non-operational state, when the data processing module 104 wants to read the hard disk of the computer system 10 or the USB external disk, the data processing module 104 must have some drivers or software modules installed therein, such that the data processing module 104 can become a master device to read data in the slave device. For example, IDE/PATA/SATA deriver or software modules must be installed in the data processing module 104, such that the data processing module 104 can become a master device to read data in the hard disk. Similarly, USB deriver or software modules must be installed in the data processing module 104, such that the data processing module 104 can become a master device to read data/audio data in the USB external disk. Persons skilled the art can increase the amount of internal drivers of the data processing module 104 according to actual requirements, to read the required data/audio data.

Otherwise, when the computer system 10 is in the operational state, the state monitor unit 102 determines that the current value supplied to the computer system 10 is greater than the predefined threshold value, such that the state monitor unit 102 de-asserts the state switch signal 102_S. Based on the state of the de-asserted state switch signal 102_S, the power switch unit 122 is closed, and the power switch unit 124 is opened, such that the power supply unit 100 stops supplying operating voltages to the data processing module 104, and changes to supply operating voltages to the logic operation module 120, such that the logic operation module 120 can perform each command of the computer system 10 in the operational state.

When the state switch signal 102_S is de-asserted, the de-asserted state switch signal 102_S also controls the data source 110 to transmit the read data (output data 110_SO) via the data switch unit 106 to be the input data (116_SI) of the logic controller 116. The logic controller 116 and the components of the logic operation module 120 can, in coordination, process the data, and output the processed data, as the output data 116_SO, to the data switch unit 106, and enable the data switch unit 106 to transmit the processed data, as the input data 108_SI of the data output unit 108, to the data output unit 108 for data output.

Figure 2:
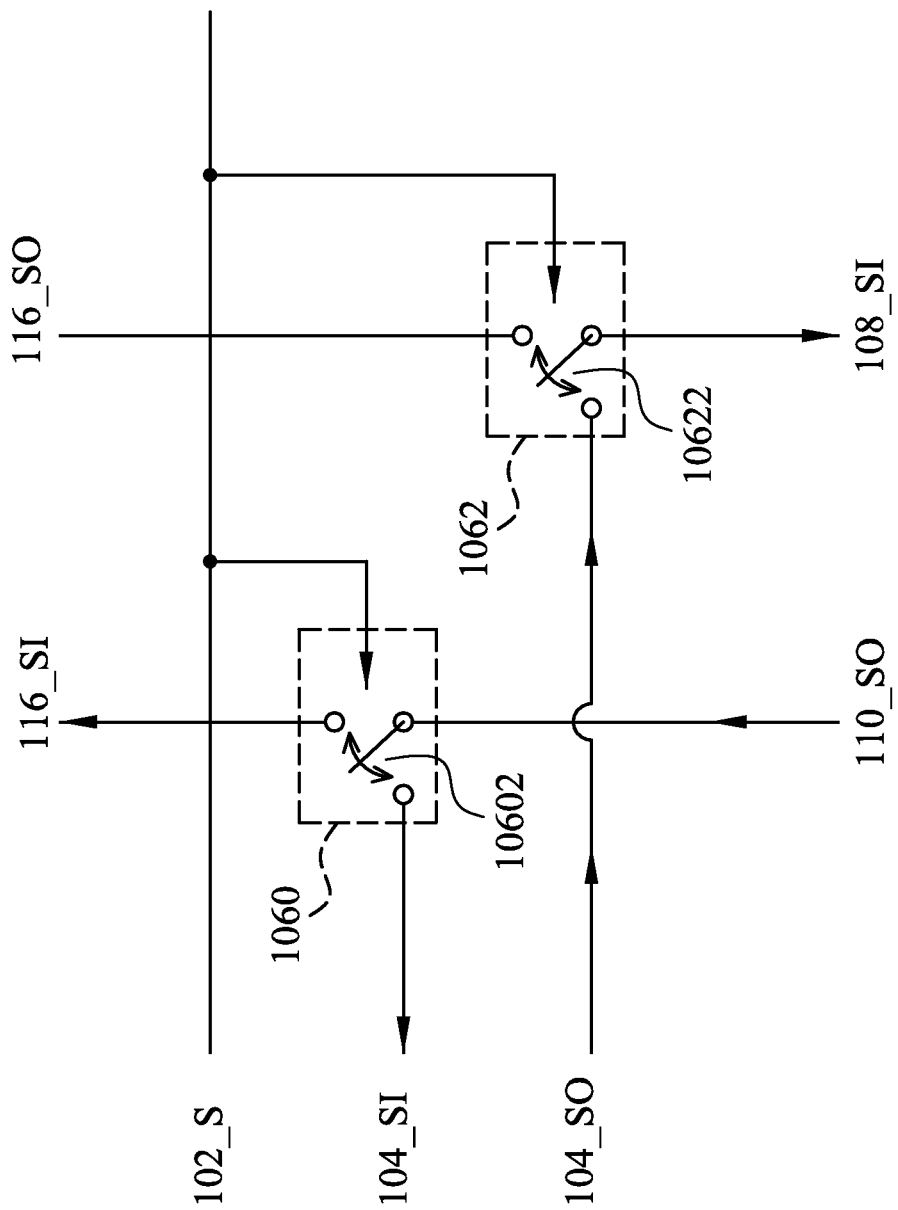
FIG. 2 is a schematic diagram illustrating an embodiment of the internal structure of a data switch unit of the invention.

FIG. 2 is a schematic diagram illustrating an embodiment of the internal structure of a data switch unit of the invention. The data switch unit 106 comprises a data input switch unit 1060 and a data output switch unit 1062. Please refer to FIGS. 1 and 2, wherein the data input switch unit 1060 comprises at least a switch 10602, which performs switching operations based on the state of the state switch signal 102_S output by the state monitor unit 102. Since the state switch signal 102_S is asserted when the computer system 10 is in the non-operational state, the state switch signal 102_S controls the switch 10602 to switch to the input end of the data processing module 104, such that the output data 110_SO from the data source 110 can become the input data 104_SI of the data processing module 104. It is understood that, if the input data of the data processing module 104 is from several data sources, several data input switches must be set for each data source. For example, when the data sources comprise the hard disk of the computer system and a network, two switches must be respectively set for the hard disk and the network.

Further, the data output switch unit 1062 comprises at least a switch 10622, which is also controlled based on the state of the state switch signal 102_S. When the computer system 10 is in the non-operational state, the state switch signal 102_S controls the switch 10622 to switch to the output end of the data processing module 104, thus to receive the output data 104_SO transmitted by the data processing module 104, and transfers the output data 104_SO as the input data 108_SI of the data output unit 108 for output. It is understood that, if the output data of the data output unit 108 has several aspects, several data output switches must be set. For example, when the output data is for a monitor, an audio output unit and an external monitor of the computer system, three switches must be respectively set for the monitor, the audio output unit and the external monitor. It is noted that, the switches 10602 and 10622 can be designed by setting at least a switch circuit on the mother board of the computer system. In this design, the overall manufacturing cost of the computer system will not be increased too much, and the complexity of the computer system would not be too high.

When the state switch signal 102_S is de-asserted, the switch 10602 switches to the input end of the logic controller 116 based on the control of the state switch signal 102_S, such that the output data 110_SO from the data source 110 can become the input data 116_SI of the logic controller 116, and the logic controller 116 and the other components, in coordination, process the received data. Similarly, the data output switch unit 1062 is also controlled by the state switch signal 102_S, such that the switch 10622 switches to the output end of the logic controller 116, to transmits the processed data/audio data from the logic operation module 120 to the data output unit 108 as the input data 108_SI via the logic controller 116 (as the output data 116_SO of the logic controller 116) and the data output switch unit 1062.

It is understood that, in this embodiment, when the data processing module 104 is used to process data, the data source 110 and the data output unit 108 originally equipped in the computer system 10 can be used, and the data processing module 104 can receive, process and output data via the switch of the data switch unit 106. The computer system 10 does not need to set additional system components in order to input and output data in the non-operational state, such that the manufacturing cost of the computer system 10 will not be increased too much while increasing efficient use of the computer system 10.

The state switch signal 102_S can be implemented by connecting a GPIO (General Purpose Input/Output) pin of the EC to the data processing module 104, and transmitting a signal to the data processing module 104 via the GPIO pin, such that the data processing module 104 is notified to begin subsequent operations.

Figure 3:
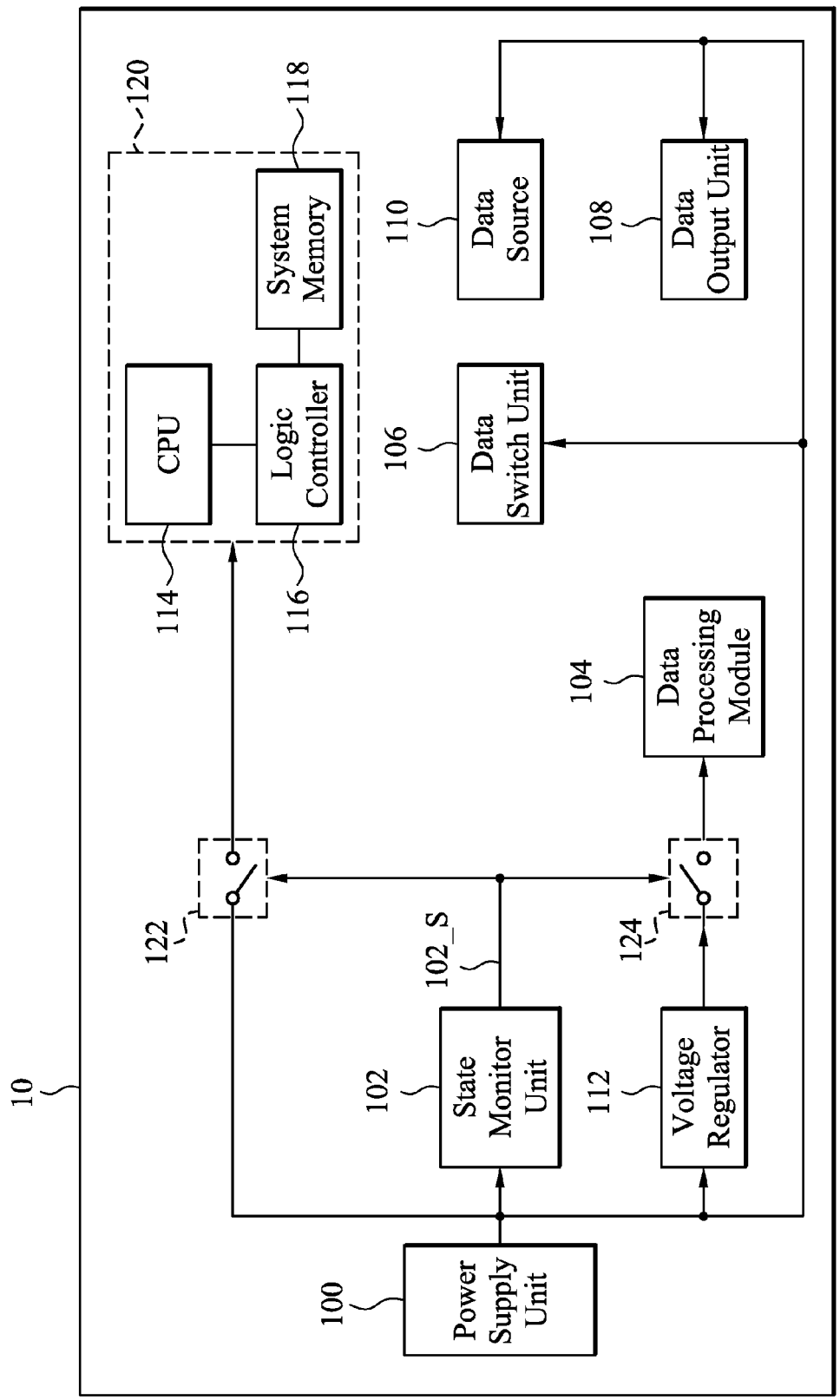
FIG. 3 is a schematic diagram illustrating an embodiment of a power state switching for a computer system for processing data in a non-operational state of the invention.

FIG. 3 is a schematic diagram illustrating an embodiment of a power state switching for a computer system for processing data in a non-operational state of the invention. When the state switch signal 102_S is asserted, the power switch unit 124 is closed, such that the data processing module starts to obtain the operating voltages, and the power switch unit 122 is opened, such that the power supplied to the logic operation module 120 is cut off. Additionally, since the data switch unit 106, the data output unit 108 and the data source 110 are always activated no matter whether the computer system 10 is in the operational state or a non-operational state, the power supply unit 100 will continue to provide operating voltages to the data switch unit 106, the data output unit 108 and the data source 110 regardless of the situation of the state switch signal 102_S (that is no matter whether the state switch signal 102_S is asserted or not).

It is noted that, the operating voltages for the respective units of the computer system 10 may be different. The power state in FIG. 3 is simplified for discussion purpose. Persons skilled the art can design related circuit layouts based on the operating voltages of the respective units.

It is noted that, when the computer system 10 enters the operational state, other system components (such as the network control unit and the logic operation module 120) of the computer system 10 except for the data processing module 104 can receive power supplied by the power supply unit 100. When users want to process data in the operational state, the computer system 10 will utilize the CPU 114 to read files stored in the hard disk via the control of the logic controller 116 (such as South and North Bridge chips), or to access files in the Internet via the network control unit, process the files, and output the processed files to the data output unit 108.

When the computer system 10 is in the operational state, operating voltages must be supplied to the respective system components, such that the CPU 114 can process data, trigger the hard disk to read and write data, and control related lights, and users can perform related activities, such as file edition, internet browsing, image rendering or watching movies via the computer system 10. It is understood that, all components except for the data processing module 104 must be in the operational state. That is, the computer system 10 cannot be in the non-operational state. Power consumption in the operational state is high, and therefore the effect of power-saving cannot be achieved.

For a general notebook, the average time, in which the power supply unit 100 can continuously supply power in the operational state, is 6 to 8 hours. According to the habits of users, the computer system 10 is activated to only perform simple tasks, such as browsing photos, listening to music, reading e-books or playing games. However, since the computer system 10 is activated, lots of power is consumed. In the embodiment of the invention, when the computer system 10 is in the suspend state, the hibernation state or the soft off state, the data processing module, which can independently process data and necessary units for outputting data, can be activated, and other units which are not used when data is output can be inactivated (not supply power to the units). In this manner, the long-winded booting procedure of the computer system 10 can be avoided, and power prepared to be supplied to the system units having no process tasks, such as for the logic operation module 120, can be saved, thus achieving the objective of power-saving. In the embodiment of the invention, a general power supply unit 100 can support the data processing module 104 to execute longer.

In addition to data or files being read from the data source 110 in the non-operational state, data can be accessed or updated via other components when the computer system 10 is in the operational state. For example, the data in the hard disk can be read via the control of the logic operation module 120, or Internet files can be accessed via the network control unit (such as the network adapter). The data or file can be input to the data output unit 108 for output. The setting for the computer system 10 in the non-operational state will not influence the normal operation of the computer system 10 in the operational state.

Figure 4:
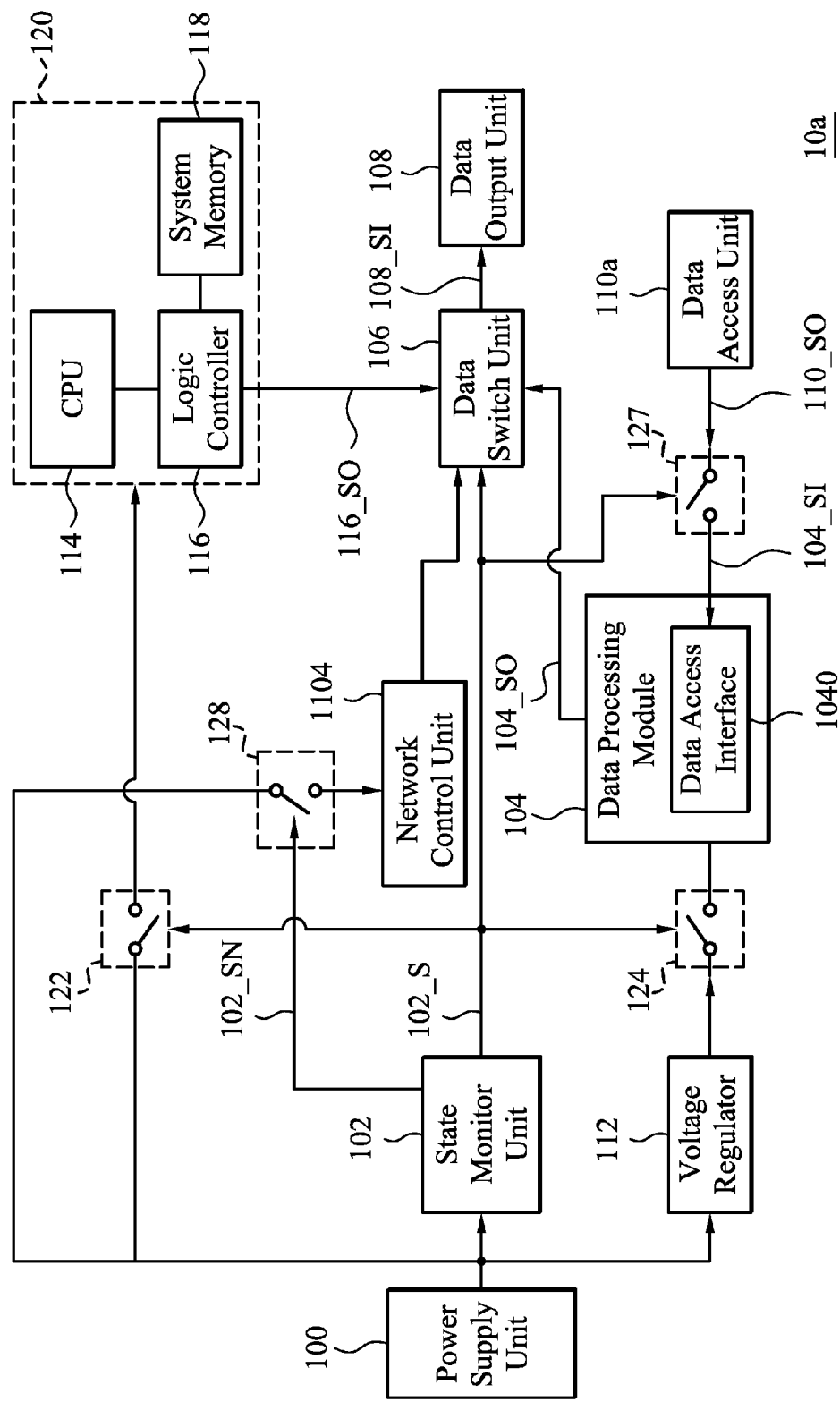
FIG. 4 is a schematic diagram illustrating another embodiment of a computer system for processing data in a non-operational state of the invention.

Further, in another embodiment of FIG. 4, a data access unit 110a directly connected with the data processing module 104 can be set in the computer system 10a, and the data access interface 1040 can be further set for the data processing module 104. The data access unit 110a and the data access interface 1040 can determine whether to input data to the data processing module 104 based on the switch of another data input switch unit 127, such that the data processing module 104 does not need to commonly use the data access unit (such as 1102 in FIG. 1) originally equipped in the computer system 10a. In other embodiments, the data input switch unit 127 can be omitted, such that the data access unit 110a can be directly connected to the data processing module 104.

Specifically, the computer system 10a may have several data access units. For example, several USB ports or card reading devices can be set on the mother board of the computer system 10a. Persons skilled the art can select one of the USB ports or one of the card reading devices for inputting data to the data processing module 104 in the non-operational state. The USB ports and card reading devices which are not selected can be provided for the computer system 10a to access data in the operational state. Furthermore, the data input switch unit 127 set between the data access interface 1040 and the data access unit 110a is also controlled by the state switch signal 102_S. When the state switch signal 102_S is asserted, the data input switch unit 127 is closed, such that output data (110_SO) of the data access unit 110a is transmitted to the data access interface 1040 as the input data 104_SI of the data processing module 104 via the data input switch unit 127. In this way, the data processing module 104 directly connects to the selected card reading device (that is the data access unit 110a), such that the data processing module 104 can directly access the data, which is placed by users in the data access unit 110a via the data access interface 1040. In this design, it is unnecessary to design a switch in the data switch unit 106 for the data access unit 110a as shown in FIG. 2. The data switch operation between the data processing module 104 and the logic controller 116 can be also dispensed, to increase the convenience of computer manufacturing.

In another embodiment, the state monitor unit 102 further sets a network switch signal 102_SN according to the power supply state of the power supply unit 100. The power switch unit 128 is closed based on the state of the asserted network switch signal 102_SN, such that the network control unit 1104 can receive operating voltages required for connecting to the network, and the data processing module 104 can obtain the data downloaded from the network. In other embodiments, a power switch unit (not shown) can be also set in the data access unit 110a, in which the power switch unit performs switching operations based on the state switch signal 102_S.

Please refer to FIG. 1 again, in this embodiment, the power reception manner of the data processing module 104 can be designed to directly connect the circuits of the data processing module 104 and the power supply unit 100 together, in which a voltage regulator 112 can be set therebetween to lower the voltage output by the power supply unit 100 to the operating voltage to a suitable level for the data processing module 104. In another embodiment, the standby power can be the power source of the data processing module 104. It is understood that, the standby power is sufficient for the voltages required for the execution of the data processing module 104.

Additionally, in addition to a control panel 10842 on an operational display unit 1084 being used to input control commands to the data processing module 104, the output of the data output unit 108 can be controlled via a remote control. For example, in the embodiment, the state monitor unit 102 can comprise an IR reception module 1020. Users can use a remote control device (remote controller) to transmit control commands. The IR reception module 1020 can receive the control commands, and the state monitor unit 102 can transmit the control commands received by the IR reception module 1020 to the data processing module 104. In actual implementation, the EC can be used to achieve the objective of remote control since the EC comprises a consumer IR (CIR) module, which can be used in the remote control mechanism of electronic devices. It is noted that, any module which can be set in the state monitor module 102, and can respond to the remote control and activate related operations in the computer system in the non-operational state can be applied in the embodiment.

Additionally, the computer system 10 may further comprise a control button 126. Since users may not want to perform other simple tasks when the computer system 10 is in the non-operational state, the control button 126 connected with the state monitor module 102 can be provided in the embodiment for users to press, to determine whether to supply power to the data processing module 104 when the computer system 10 is in the non-operational state. When the state monitor module 102 has detected that the computer system 10 is in the non-operational state, it suspends the assertion of the state switch signal 102_S, but continues to determine whether an activation signal trig_S generated by the control button 126 has been received, and performs the assertion if so. When the control button 126 has been pressed and the activation signal trig_S is accordingly generated, the state monitor module 102 asserts the state switch signal 102_S based on the activation signal trig_S, such that the data processing module 104 can begin to receive operating voltages.

In another embodiment, the computer system 10 can comprise a control button 130 which is connected to the data processing module 104, and users can use the control button 130 to control the execution of the data processing module 104. When the computer system 10 is in the non-operational state, the data processing module 104 has already obtained the power supplied by the power supply unit 100. However, before the control button 130 has been pressed to activate the data processing module 104, the data processing module 104 has not accessed data, and uses a little bit of standby power to detect whether the control button 130 has been pressed or not (close circuit or open circuit). Once the control button 130 has been pressed, which represents that a user wants to receive the data processed by the data processing module 104, the data processing module 104 is activated to process data.

In further another embodiment, the computer system 10 can further comprise a display unit 1084 and a rotation monitor unit 1086 for detecting whether the display unit 1084 has been rotated or not. The rotation monitor unit 1086 can be used to replace the control button 126 connected to the state monitor unit 102, to transmit the activation signal trig_S to the state monitor unit 102 based on the rotation of the display unit 1084, such that the state monitor unit 102 can assert the state switch signal 102_S based on the non-operational state and the activation signal trig_S, and the data processing module 104 can begin to receive operating voltages. The display unit 1084 may be a rotatable monitor of the computer system 10. For example, a table PC may have a monitor and an operational platform. The monitor connects to the operational platform via a connection unit. When users want to perform simple tasks (supplying power to the data processing module 104), the connection unit can be rotated, making the monitor reversed to the operational platform, to generate the activation signal trig_S.

Based on various requirements, the data processing module 104 and the data output unit 108 may have various aspects, and several embodiments thereof follow.

First Embodiment

Refer to FIG. 1 again, when the output data 110_SO of the data source 110 is data such as audio data conforming to a data format of music, the data processing module 104 may be an audio control module having an encoding/decoding capability, and the data output unit 108 may be an audio output unit 1082. In this case, the data processing module 104, such as a MP3 decoding module, can read audio data stored in the internal storage unit (such as hard disk) or the external storage unit (such as USB external hard disk) of the computer system 10 via a data bus. Then, a processor (such as digital processing unit (DSP) or microprocessor) inside the data processing module 104, a converter (such as digital analog converter (DAC)) and other can perform related procedures, such as edition, decoding, and transformation. The above audio data can comprise any data format which is capable to be played in the MP3 decoding module, such as MP3, WAV, or WMA.

Further, the audio output unit 1082 can further couple with an earphone output and a speaker. The audio output unit 1082 can also output audio to a Bluetooth transmission module for a Bluetooth earphone or a FM (frequency modulation) module.

The computer system 10 can further comprise a control panel 10842 comprising several operational units (such as playback and volume keys) set on the display unit 1084. Users can use these operational units to generate the control commands for controlling the data processing module 104 to perform the corresponding audio processing operations.

Second Embodiment

When the output data 110_SO of the data source 110 is multimedia data (comprising: audio data and image data, such as video/graphics data), the data processing module 104 may be a multimedia control module having an encoding/decoding capability, and the data output unit 108 can comprise a display unit 1084 (for outputting video/image/graphics data) and an audio output unit 1082 (for outputting audio data). The operations of the data processing module 104, such as a MP4 playback module, a processor (such as DSP or microprocessor inside the data processing module 104, a converter (such as DAC) and other are similar to that of the above MP3 decoding module, and are omitted herefrom.

Additionally, the multimedia data may be audio data, image data, or video data combining the audio and images. The image data comprises still pictures, graphics data, and animation or videos composed of a series of pictures. In the embodiment, the multimedia data comprises at least the image data, used for photo browsing in the non-operational state.

Further, the audio output unit 1082 for outputting audio data is discussed in the above embodiment, and is omitted herefrom. When the multimedia data simultaneously comprise image data and audio data (for example, when a picture contains background music), in addition to the display unit 1084 for displaying the image data, the audio output unit 1082 can play back audio.

Additionally, the control panel 10842 of the display unit 1084 can comprise several operational units (such as playback and volume keys). Users can use these operational units to generate the control commands for controlling the data processing module 104 to perform the corresponding multimedia processing operations.

Figure 2A:
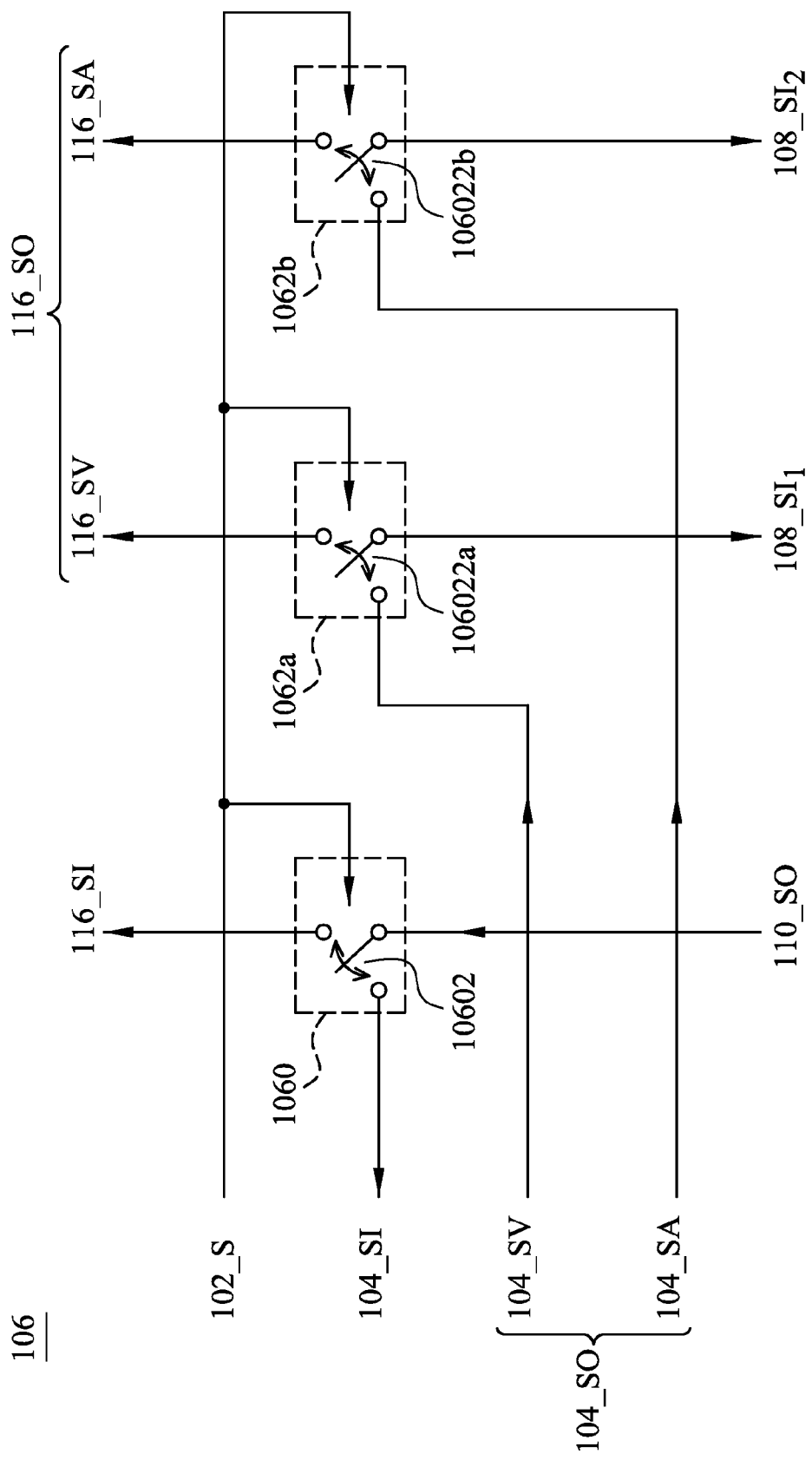
FIG. 2A is a schematic diagram illustrating another embodiment of the internal structure of a data switch unit of the invention.

It is understood that, in the embodiment, the internal structure of the data switch unit 106 is shown in FIG. 2A. The data switch unit 106 comprises a data (multimedia data) input switch unit 1060, a video/image/graphics data output switch unit 1062a, and an audio data output switch unit 1062b. The data (multimedia data) input switch unit 1060 comprises a switch 10602, the video/image/graphics data output switch unit 1062a comprises a switch 10622a, and the audio data output switch unit 1062b comprises a switch 10622b. When the computer system 10 is in the non-operational state, the switches 10622a and 10622b switch to the output end of the data processing module 104 to respectively receive the video/image/graphics data 104_SV and the audio data 104_SA (a part of the output data 104_SO) transmitted from the data processing module 104, and respectively transmit the video/image/graphics data 104_SV and the audio data 104_SA to the display unit 1084 and the audio output unit 1082, as the input data 108_SI₁ and 108_SI₂ of the display unit 1084 and the audio output unit 1082.

Third Embodiment

When the output data 110_SO of the data source 110 is e-book data (comprising: texts, graphics and images of the e-book), the data processing module 104 may be an e-book control module, and the data output unit 108 can comprise a display unit 1084. Please refer to FIG. 5, wherein the data processing module 104 (e-book control module) can comprise a control command processing unit 1042, a storage data control unit 1044, a network data control unit 1046, an e-book data processing unit 1048, and a display data processing unit 1050.

The control command processing unit 1042 receives and analyzes a control command ctrl_S output by the control panel, and based on the various content of the control command ctrl_S, respectively transmit a request for reading an e-book to the data access unit or the network control unit via the storage data control unit 1044 or the network data control unit 1046. If the e-book data is stored in the storage unit connected to the data access unit, the storage data control unit 1044 will receive the output data (input data 104_SI) of the data access unit 1102, to obtain the e-book data waiting to be processed. If the e-book data is stored in a server in the Internet or another computer, the network data control unit 1046 will receive the e-book data (input data 104_SI) downloaded by the network control unit 1104.

Figure 5:
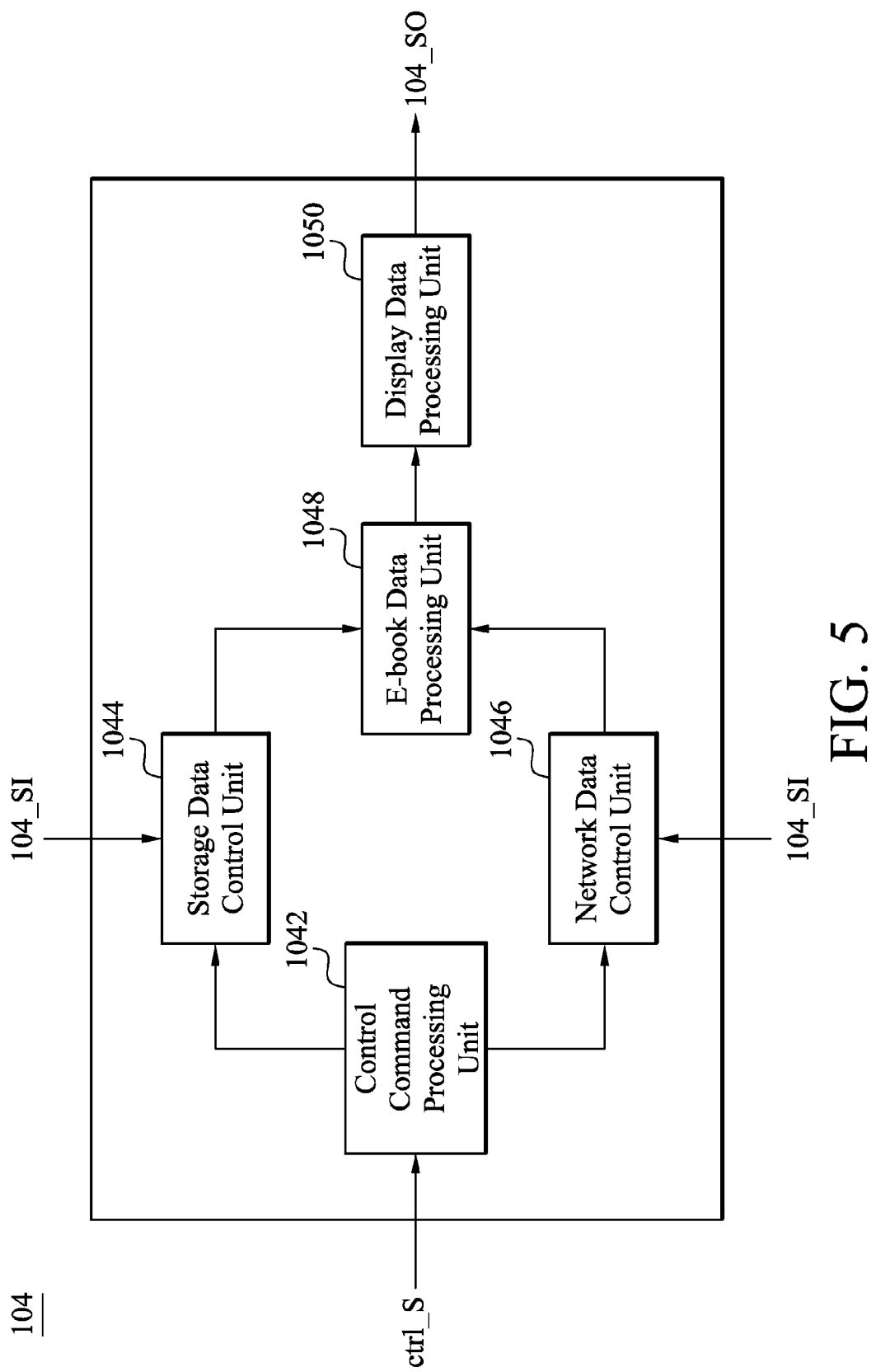
FIG. 5 is a schematic diagram illustrating an embodiment of a data processing module of the invention.

Please refer to FIGS. 1 and 5, the computer system 10 can further set a control panel 10842 comprising several operational units (such as previous page, next page, selection of e-book source keys) set on the display unit 1084. Users can use these operational units to generate the control commands ctrl_S for controlling the data processing module 104 to perform the corresponding e-book processing operations. For example, when the operational unit of selection e-book source key has been pressed, the data processing module 104 can receive the e-book data stored in the storage unit via the data access unit 1102, or receive the e-book data downloaded from the Internet by the network control unit 1104.

Fourth Embodiment

Please refer to FIG. 1, when the output data 110_SO of the data source 110 is a game program or data (comprising image and audio data), the data processing module 104 may be a game control module, and the data output unit 108 may be a combination of a display unit 1084 (for outputting video/image/graphics data) and an audio output unit 1082 (for outputting audio data), or may be an external display unit 10884 by way of an output connection unit 10882. For example, if the computer system 10 is a portable computer, the output connection unit 10882 may be a high definition multimedia interface (HDMI) or an AV composite video interface, and can be connected to the display unit 10884 having a capable connection interface via a cable. The external display unit 10884 may be a TV monitor or a projector having a transmission interface, which is compatible with the transmission interface of the computer system 10. It is noted that, in this embodiment, no additional connection units should be set for playing games in the non-operational state, and the HDMI or AV connection port, which are originally set in the portable computer can be directly used.

Figure 6:
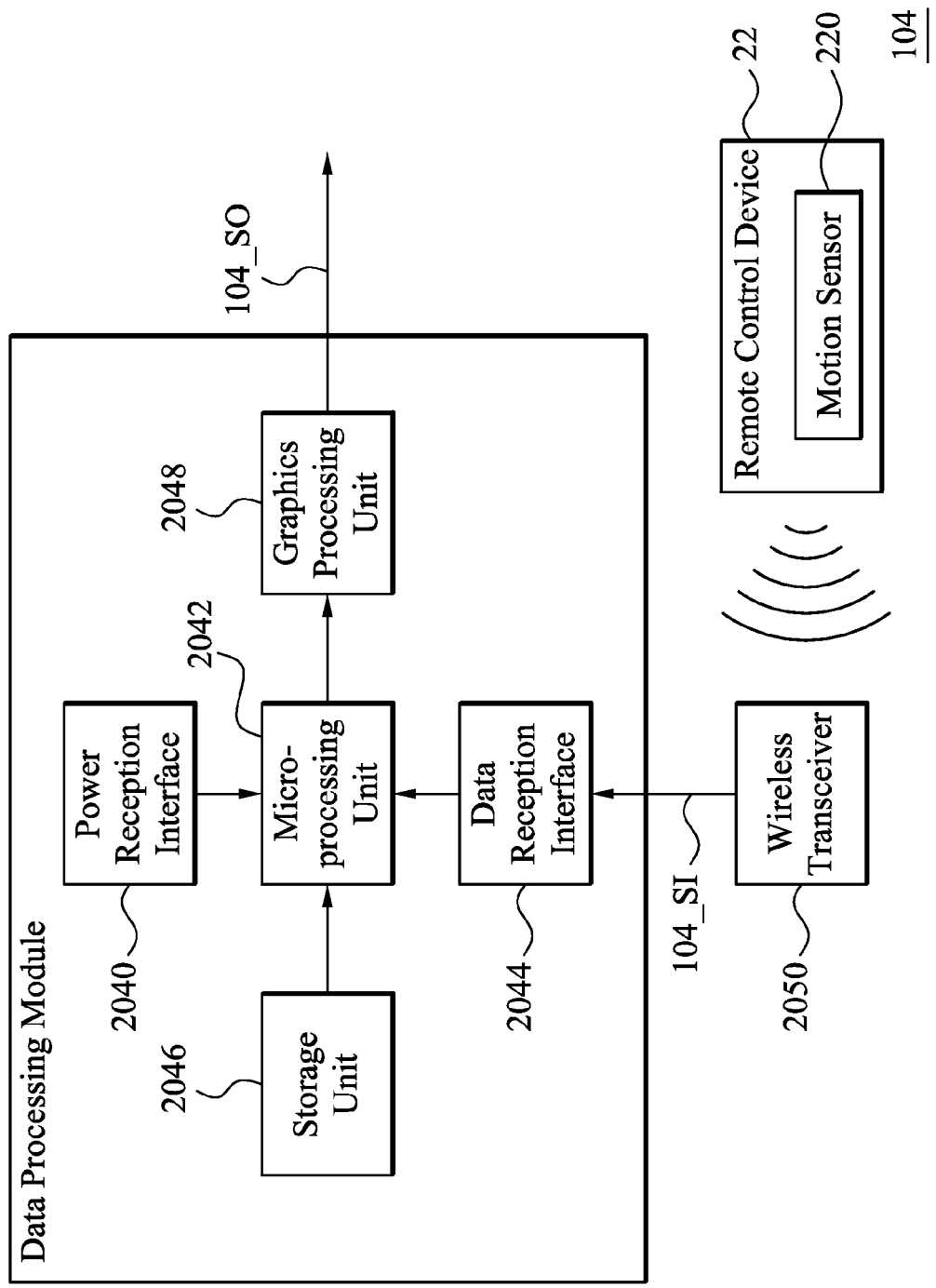
FIG. 6 is a schematic diagram illustrating another embodiment of a data processing module of the invention.

Please refer to FIG. 6, the data processing module 104 (game control module) may comprise a power reception interface 2040, a micro-processing unit 2042, a data reception interface 2044, a storage unit 2046, a graphics processing unit (GPU) 2048, and a wireless transceiver 2050. The wireless transceiver 2050 may be a Bluetooth, IR or RF signal transmission unit. Further, the computer system 10 can further comprise a remote control device 22. Users can use the remote control device 22 to transmit data or commands to the data processing module 104 for interactive games. Please simultaneously refer to FIG. 1, the power reception interface 2040 is coupled to the power supply unit 100 to receive voltages. The data reception interface 2044 receives the control commands or motion signals from the remote control device 22 via the wireless transceiver 2050. After the voltages are received via the power reception interface 2040, the micro-processing unit 2042 reads the game program stored in the storage unit 2046 based on the control command received by the data reception interface 2044, and based on the design of the game program, responds to the control commands or motion signals input via the remote control device 22 by users. For example, a virtual incarnation which simulates that a user action has been generated, or a corresponding game content is executed according to the input control commands. Then, a graphics rendering command is generated, and transmitted to the GPU 2048 for rendering a game picture. The game picture is the output data 104_SO, which is transmitted to the external display unit 10884 for display via the data switch unit 106 and the output connection unit 11882 (or directly transmitted to the display unit 1084 of the computer system 10) for display. After the game picture is viewed, the users can continue to perform a corresponding game action.

Further, the remote control device 22 can comprise a motion sensor 220, such as an accelerometer. When the remote control device 22 is hold and swung by users, and a corresponding acceleration is generated, the motion sensor 220 will detect the variation in acceleration of the remote control device 22, and generate a motion signal, such as a 3-D acceleration signal. The motion signal will be wirelessly transmitted to the wireless transceiver 2050 of the computer system 10 via the transmission interface of the remote control device 22. The micro-processing unit 2042 of the data processing module 104 performs related calculations and processing operations according to the motion signal and the game program, to provide related data to the GPU 2048, and the GPU 2048 accordingly renders a picture corresponding to the motion of the remote control device 22.

In a further embodiment, the game program can be accessed via the data access unit 1102, and the storage unit 2046 of the data processing module 104 does not need to store the game program. In this way, manufacturing cost and hardware size of the data processing module 104 can be reduced. When users want to use the computer system 10 to play different interactive games, only the external storage unit 1106 needs to be replaced.

Figure 7:
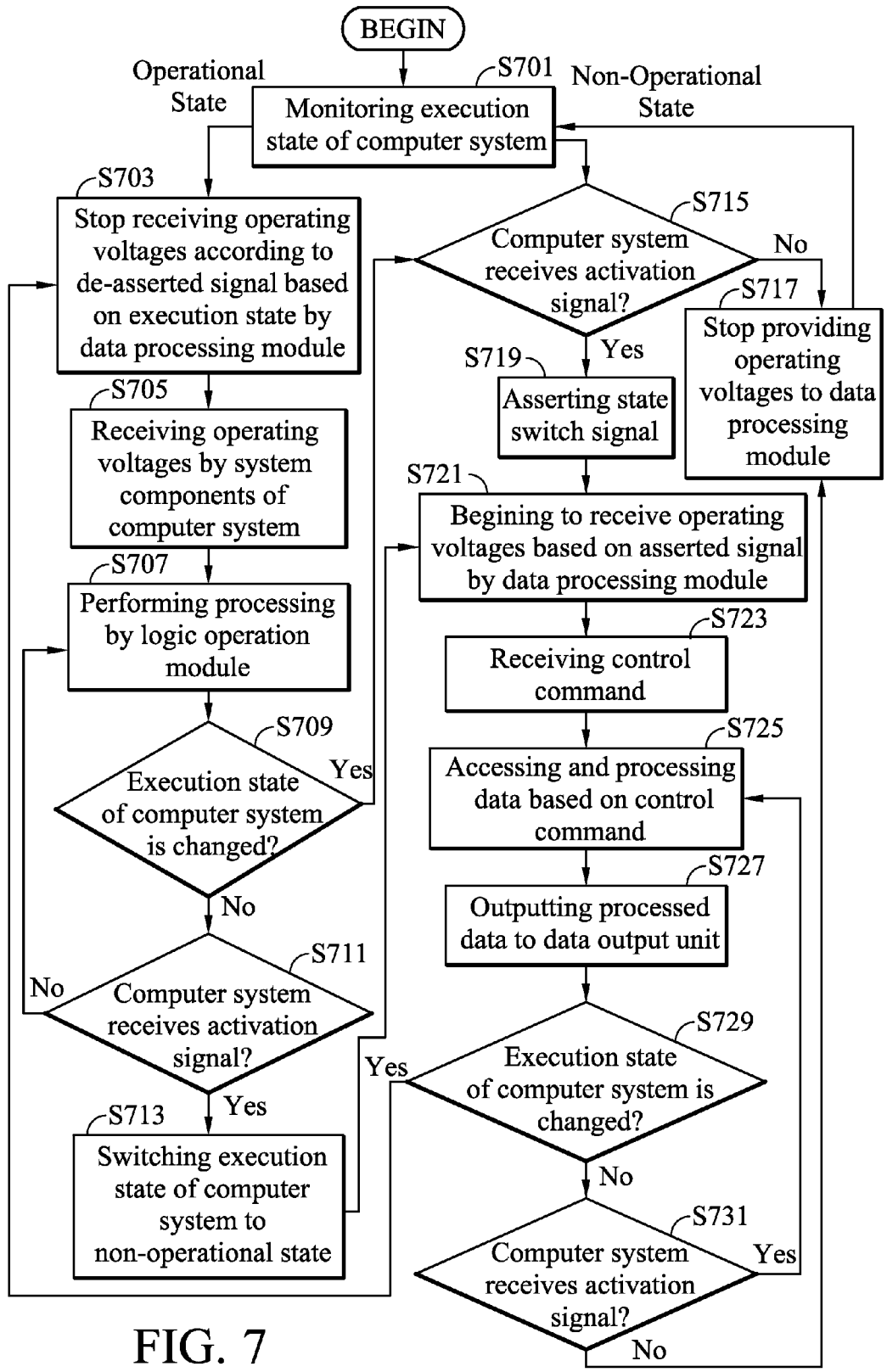
FIG. 7 is a flowchart of an embodiment of a method for processing data in a non-operational state for a computer system of the invention.

FIG. 7 is a flowchart of an embodiment of a method for processing data in a non-operational state for a computer system of the invention. Please refer to FIG. 1 and FIG. 7, in this embodiment, the computer system 10 continues to utilize the state monitor unit 102 to monitor the state of the computer system 10, and determine whether the state of the computer system 10 is the operational state or a non-operational state (S701). When the computer system 10 is in the operational state, the state monitor unit 102 de-asserts the state switch signal 102_S, such that the data processing module 104 stops receiving the required operating voltages (S703). On the other hand, when the computer system 10 is in the non-operational state, the state monitor unit 102 further determines whether the control button 126 has been pressed, and an activation signal trig_S has accordingly been generated, or determines whether the display unit 1084 has been rotated, and the activation signal trig_S has been triggered due to the rotation of the rotation monitor unit 1086 (S715).

If the computer system 10 is in the non-operational state, and the activation signal trig_S has not been received, the operating voltages are not input to the data processing module 104 (S717), and the procedure returns to S701 to continue to monitor the state of the computer system 10. However, if the computer system 10 receives the activation signal trig_S, the state monitor unit 102 asserts the state switch signal 102_S (S719), and controls the data processing module 104 to begin to receive the operating voltages supplied by the power supply unit 100 (S721). After the required operating voltages are received, the data processing module 104 receives the control command ctrl_S from the control panel 10842 (S723), and obtains the input data 104_SI (data waiting for processing) for related processing, such as encoding, decoding or editing, from the data access unit 1102 or the network control unit 1104 based on the content of the control command ctrl_S (S725). The processed data is output from the data processing module 104 to the data output unit 108 for output (S727). As a result, users can obtain required data in various manners (such as text, graphic, image and audio) via the data output unit 108.

In the above procedure, even if the computer system 10 is in the non-operational state, the state monitor unit 102 will still detect the power supply state of the power supply unit 100, to continue to determine whether the execution state of the computer system 10 has been changed or not (S729). That is, it is determined whether the computer system 10 has entered the operational state. If the execution state has not been changed, it is further determined whether the state monitor unit 102 has received the activation signal trig_S or not (S731). When the execution state has not been changed and the state monitor unit 102 still receives the activation signal trig_S, the computer system 10 will continue to process the data based on the control command ctrl_S (the procedure returns to S725). If the execution state has not been changed, and the activation signal trig_S has been terminated, such as the control button 126 has been pressed again by users, or the display unit 108 is rotated to the original state, the procedure returns to S717, in which the operating voltages are not supplied to the data processing module 104. However, if the state monitor unit 102 determines that the computer system 10 has entered the operational state based on the change of the power supply state (such as the current value is greater than a predefined threshold value) in step S729, the following procedure is performed based on the operational state of the computer system 10.

After the detection and determination of step S701 or S729, it is understood that the computer system 10 has entered the operational state, in addition to the state switch signal 102_S being de-asserted, such that the data processing module 104 has stopped receiving the operating voltages (S703). The system components comprising the logic operation module 120 and hard disk of the computer system begin to receive operating voltages based on the control of the state switch signal (S705), and the CPU 114 and the logic controller 116 in the logic operation module 120 perform related processing operations and calculations for the data (S707).

Next, similarly, the state monitor unit 102 determines whether the execution state of the computer system 10 is changed or not in the operational state (S709), that is, the state monitor unit 102 determines whether the execution state of the computer system 10 is changed to the non-operational state. If so, step S715 is performed based on the procedure of the non-operational state. If the execution state has not been changed, it is further determined whether the state monitor unit 102 has received the activation signal trig_S transmitted by the control button 126 or the rotation monitor unit 1086 (S711). If the state monitor unit 102 has not received the activation signal trig_S, the procedure returns to step S707, and data processing and calculations continue. If the activation signal trig_S has been received in the operational state, the logic operation module 120 will enable the operating system to enter the standby state or the hibernation state based on the notification of the state monitor unit 102, such that the computer system 10 enters the non-operational state (S713), and the step S719 and the following steps are performed.

Therefore, no matter if the computer system 10 is in the operational state or a non-operational state, it can provide or suspend the data access service based on the power supply state and usage requirements of users.

According to the above embodiments, the present invention discloses a data access service with a power-saving benefit when the computer system is in a non-operational state. In addition to power consumption being reduced, operating efficiency of the computer system, such as portable computer can be also raised. Except for the data processing module and the switches of the computer system of the present invention, other components required to achieve the objective of the present invention can be implemented by directly utilizing the components originally equipped in the computer system, such as the state monitor unit, the display unit, the data access unit, and the network control unit of the computer system during manufacturing. As described in the embodiments, in implementation, the switches and the state monitor unit can be set on the mother board of the computer system using a simple manner, in which the manufacturing cost will not be increased too much, but a longer battery life span and more functions of the computer system can be used by users.

Methods for processing data in a non-operational state for a computer system, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed:

1. A computer system for processing data in a non-operational state, comprising:
   a data output unit;
   a data source;
   a data switch unit;
   a data processing module accessing and processing data from the data source, and transmitting the processed data to the data output unit;
   a state monitor unit monitoring a power supply state of the computer system to accordingly generate a state switch signal, which indicates whether the computer system is in an operational state or a non-operational state; and
   wherein when the state switch signal indicates that the computer system is in the non-operational state, the data source and the data processing module receives operating voltages to access and process data, wherein the data source comprises a data access unit, a network control unit, or a combination of both, and the computer system and the data processing module access the data stored in a storage unit via the data access unit, and the data processing module connect to a network and access the data from the network via the network control unit;
   if the data source is the network control unit, the data switch unit further comprises a network data switch unit performing switching operations based on the state of the state switch signal, and transmitting the data obtained by the network control unit to the data processing module when the state switch signal indicates that the computer system is in the non-operational state;
   if the data source is the data access unit, the data switch unit further comprises a storage data switch unit performing switching operations based on the state of the state switch signal, and transmitting the data obtained by the data access unit to the data processing module when the state switch signal indicates that the computer system is in the non-operational state; and the data switch unit further comprises a data output switch unit performing switching operations based on the state of the state switch signal, and transmitting the data processed by the data processing module to the data output unit when the state switch signal indicates that the computer system is in the non-operational state.

2. The computer system of claim 1, further comprising a power switch unit performing switching operations based on the state of the state switch signal, and transmitting the operating voltages to the data processing module when the state switch signal indicates that the computer system is in the non-operational state.

3. The computer system of claim 1, further comprising a power supply unit providing required voltages for the computer system at the operational state and the non-operational state, wherein when the state switch signal indicates that the computer system is in the non-operational state, the power supply unit supplies the operating voltages to the data processing module and the data source.

4. The computer system of claim 1, wherein the state monitor unit is an embedded controller, and the embedded controller comprises a general purpose input/output pin connected with the data processing module, for controlling whether the data processing module receives or stops receiving the operating voltages.

5. The computer system of claim 1, further comprising a control button connected with the state monitor unit, for generating an activation signal based on activation of the control button, wherein when the state monitor unit determines that the computer system is in the non-operational state, and the activation signal is detected, the data source and the data processing module are enabled to receive the operating voltages, and access and process the data.

6. The computer system of claim 1, wherein the data output unit comprises:
 a display unit; and
 a rotation monitor unit connected with the display unit, detecting a rotation of the display unit to generate an activation signal, and transmitting the activation signal to the state monitor unit.

7. The computer system of claim 1, wherein when the data is audio data, the data processing module is an audio control module, and the data output unit is an audio output unit.

8. The computer system of claim 1, wherein when the data is video data, the data processing module is a multimedia control module, and the data output unit comprises an audio output unit and a display unit.

9. The computer system of claim 1, wherein when the data is e-book data, the data processing module is an e-book control module, and the data output unit is a display unit.

10. The computer system of claim 1, wherein when the data is game data, the data processing module is a game control module, and the data output unit is a combination of a first display unit and an audio output unit, or a combination of an output connection unit and a second display unit.

11. The computer system of claim 1, wherein the non-operational state is a suspend/standby state, a hibernation state, or a soft off state.

12. A method for processing data in a non-operational state for a computer system, wherein the computer system comprises a data output unit, a data source, a data processing module and a data switch unit, the method comprising:
 accessing and processing by the data processing module data from the data source and transmitting the processed data to the data output unit;
 monitoring by a state monitor unit a power supply state of the computer system to accordingly generate a state switch signal, the state switch signal indicating whether the computer system is in an operational state or the non-operational state;
 receiving by the data source and the data processing module operating voltages to access and process data when the state switch signal indicates that the computer system is in the non-operational state, wherein the data source comprises a data access unit, a network control unit, or a combination of both;
 accessing by the computer system and the data processing module the data stored in a storage unit via the data access unit; and
 connecting by the data processing module to a network, the data processing module accessing the data from the network via the network control unit;
 wherein if the data source is the network control unit, the data switch unit further comprises a network data switch unit, and further comprising:
  switching by the network data switch unit based on the state of the state switch signal, and transmitting the data obtained by the network control unit to the data processing module when the state switch signal indicates that the computer system is in the non-operational state;
 wherein if the data source is the data access unit, the data switch further comprises a storage data switch unit, and further comprising:
  switching by the storage data switch unit based on the state of the state switch signal, and transmitting the data obtained by the data access unit to the data processing module when the state switch signal indicates that the computer system is in the non-operational state;
 wherein the data switch unit further comprises a data output switch unit, further comprising:
  switching by the data output switch based on the state of the state switch signal, and transmitting by the data output switch the data processed by the data processing module to the data output unit when the state switch signal indicates that the computer system is in the non-operational state.

13. The method of claim 12, further comprising switching by a power switch unit based on the state of the state switch signal, and transmitting the operating voltages to the data processing module when the state switch signal indicates that the computer system is in the non-operational state.

14. The method of claim 12, further comprising a power supply unit providing required voltages for the computer system at the operational state and the non-operational state, wherein when the state switch signal indicates that the computer system is in the non-operational state, the power supply unit supplies the operating voltages to the data processing module and the data source.

15. The method of claim 12, wherein the state monitor unit is an embedded controller, and the embedded controller comprises a general purpose input/output pin connected with the data processing module, for controlling whether the data processing module receives or stops receiving the operating voltages.

16. The method of claim 12, further comprising a control button connected with the state monitor unit, for generating an activation signal based on activation of the control button, wherein when the state monitor unit determines that the computer system is in the non-operational state, and the activation signal is detected, the data source and the data processing module are enabled to receive the operating voltages, and access and process the data.

\* \* \* \* \*